(12) United States Patent
Simon

(10) Patent No.: US 7,724,608 B2
(45) Date of Patent: May 25, 2010

(54) PASSIVE REFLECTIVE IMAGING FOR VISUALIZING SUBSURFACE STRUCTURES IN EARTH AND WATER

(75) Inventor: Wayne Simon, 28479 Douglas Park Rd., P.O. Box 125, Evergreen, CO (US) 80439

(73) Assignee: Wayne Simon, Evergreen, CO (US)

( * ) Notice: Subject to any disclaimer, the term of this patent is extended or adjusted under 35 U.S.C. 154(b) by 0 days.

(21) Appl. No.: 12/176,985

(22) Filed: Jul. 21, 2008

(65) Prior Publication Data

US 2009/0059721 A1 Mar. 5, 2009

Related U.S. Application Data

(60) Provisional application No. 60/951,042, filed on Jul. 20, 2007.

(51) Int. Cl.
*G01V 1/00* (2006.01)
(52) U.S. Cl. ....................................................... 367/61
(58) Field of Classification Search .............. 367/50–52
See application file for complete search history.

(56) References Cited

U.S. PATENT DOCUMENTS

| | | | |
|---|---|---|---|
| 3,812,457 A | 5/1974 | Weller | |
| 3,817,345 A * | 6/1974 | Bailey | 367/86 |
| 5,377,104 A | 12/1994 | Sorrells et al. | |
| 5,892,732 A | 4/1999 | Gersztenkorn | |
| 6,199,016 B1 | 3/2001 | Zuykov | |
| 6,389,361 B1 | 5/2002 | Geiser | |
| 6,456,566 B1 | 9/2002 | Aronstam | |
| 6,536,553 B1 | 3/2003 | Scanlon | |
| 6,747,914 B2 | 6/2004 | Aronstam | |
| 6,791,901 B1 | 9/2004 | Robertsson et al. | |
| 2002/0152032 A1 | 10/2002 | Bird et al. | |
| 2003/0026166 A1* | 2/2003 | Aronstam | 367/25 |
| 2003/0130796 A1* | 7/2003 | Wiggins | 702/14 |
| 2003/0187583 A1* | 10/2003 | Martin et al. | 702/14 |
| 2004/0098200 A1 | 5/2004 | Wentland et al. | |
| 2005/0103766 A1 | 5/2005 | Iizuka et al. | |
| 2005/0173111 A1 | 8/2005 | Bostick, III | |
| 2006/0056272 A1* | 3/2006 | Hill | 367/73 |

* cited by examiner

*Primary Examiner*—Jack W. Keith
*Assistant Examiner*—Krystine Saito
(74) *Attorney, Agent, or Firm*—Marsh Fischmann & Breyfogle LLP

(57) ABSTRACT

A system and method is provided that uses signals from a plurality of seismic sensors to define an acoustic lens for subsurface imaging. More specifically signals provided by an array of sensors/geophones may be utilized to form an acoustic lens that can be focused on a subterranean point by properly adjusting the signals recorded at each sensor prior to summation of those signals. To form such an acoustic lens, each of the seismic sensors is moved onto a hypothetical acoustic lens surface (e.g., spherical surface) having a focal point located on the subterranean point of interest in order to calculate a time delay for each signal. Once the signals for each sensor is time-delayed, information in the time-delayed signals, which is received from the point of interest, may be temporally aligned. Accordingly, the time delayed signals may be combined to generate reflection information for the point of interest.

29 Claims, 4 Drawing Sheets

PASSIVE REFLECTIVE IMAGING FOR VISUALIZING SUBSURFACE STRUCTURES IN EARTH AND WATER

CROSS REFERENCE TO RELATED APPLICATION

This application claims priority and the benefit of the filing date under 35 U.S.C. 119 to U.S. Provisional Application No. 60/951,042, entitled, "Passive Reflective Imaging for Visualizing Subsurface Structures in Earth and Water," filed on Jul. 20, 2007, the contents of which are incorporated herein as if set forth in full.

FIELD OF INVENTION

The present invention relates to seismic exploration and underwater vision. More specifically, the present invention relates to passive seismic imaging that may be performed free of active seismic sources such as dynamite, vibrators, or air guns.

BACKGROUND OF THE INVENTION

In active seismic exploration, a subterranean area of interest is typically imaged by transmitting shots from active seismic sources and receiving reflected sonic/acoustic energy at multiple sensors/receivers (i.e., geophones or hydrophones) arranged in an array. The signals received at each geophone define a trace of seismic data. Each such trace may include a number of features or peaks (also known as reflections and wavelets) corresponding to a number of subterranean reflectors or events. Due to the lateral offsets of the geophones in the array, the timeframe of the different traces for each geophone varies. Accordingly, these timeframes may be adjusted (e.g., normalized/correlated), and the adjusted traces may be stacked to yield data having a higher signal to noise ratio. This allows for better identification of subterranean events.

Such active seismic exploration requires the use of active seismic sources such as dynamite and/or vibrators. However, there are situations in which it may be desirable to avoid the use of active seismic sources. For instance, it may be difficult to utilize active seismic sources in rugged terrain or in populated areas. Further, use of such active seismic sources adds significantly to the cost of seismic imaging. In this regard, it may be preferable to utilize a passive seismic exploration method that does not utilize active seismic sources. In such a method, passive seismic sources may be utilized to generate seismic images of the subsurface. Such sources include, for example, micro-earthquakes and other natural ground vibration sources as well as surface generated noise such as that due to wind, cultural (oil pumps, quarry blasts, highway vehicles, etc.) or animal habitation or the like. Under the ocean, ice pack, waves, and animal noise may serve the same purpose.

One such theoretical passive seismic imaging system is sometimes referred to as "acoustic daylight imaging." Acoustic daylight imaging is based on the theory that the seismic noise within the earth is analogous to daylight within the atmosphere. That is, both are incoherent, random fields of energy propagating in all directions, though their source mechanisms are different. In optical imaging, images are possible because the presence of an object modifies the ambient illumination by scattering the incident radiation (i.e., light). When the scattered light is focused by an optical lens onto a focal surface (e.g., retina or film), an image is created. Likewise, it is theorized that acoustic energy within the earth is reflected by objects within the earth. Accordingly, passive reflective imaging theorizes that an acoustic lens could be utilized to focus acoustic energy scattered by a subterranean object onto a focal surface. Simply stated, seismic vibrations/ energy are considered similar to light and it is theorized that these vibrations will illuminate underground structures if properly focused. However, at present, no practical acoustic lens has been developed that allows for focusing on subterranean objects using ambient noise.

SUMMARY OF THE INVENTION

Accordingly, the present inventors have provided systems and methods (i.e., utilities) that overcome the shortcomings of previous passive seismic methods. In this regard, the utilities include the use of a plurality of seismic receivers (e.g., data acquisition modules) that are placed on or near the earth's surface in an array pattern. This array of receivers is utilized to record seismic information and produce signals indicative thereof. These signals are used to focus on subterranean points of interest. In this regard, it is recognized that the signals provided by an array of sensors/geophones may be utilized as a lens that can be focused on a subterranean point by properly adjusting the signals recorded at each sensor/ geophone prior to summation of those signals. In this regard, it is believed that every granule of rock is a potential reflector. Accordingly, each sensor/geophone signal is believed to contain information associated with each such subterranean point within a field of focus of the array. By correctly adjusting the signals of multiple different seismic receivers, the information associated with each subterranean point of interest may be focused on in order to generate image or reflection information for that point. Accordingly, by focusing on a plurality of such points, a subterranean image may be generated.

According to a first aspect, a utility is provided wherein each of a plurality of seismic signals associated with an array of seismic receivers is adjusted to focus on data associated with a selected subterranean point of interest. Once so adjusted, the adjusted seismic signals are summed, and this sum is indicative of a reflection value for the subterranean point of interest. In one arrangement, obtaining the seismic signals includes recording data associated with passive vibration sources. In such an arrangement, at least a portion for all of the seismic receivers may be surface-based receivers (land or marine surface).

Adjusting the signals to focus on the subterranean point of interest may include time delaying at least a portion of each signal such that data associated with the point of interest in each of the signals is substantially aligned. In one arrangement, this includes time delaying each of the signals such that ray paths (e.g., the shortest path in time from the subterranean point of interest to an individual receiver) are equal for each of the receivers. In one arrangement, this includes moving each receiver along its respective ray paths to a position on a hypothetical spherical surface. In such an arrangement, the subterranean point of interest is the center of the spherical surface, and the time delay for each signal is based on a distance between the original location of the seismic receiver and the location on the spherical surface. Stated otherwise, each of the seismic sensors is moved onto a hypothetical acoustic lens surface (e.g., spherical surface) having a focal point located on the subterranean point of interest. This allows for calculating a time delay for each signal such that information in each of the signals that is received from the point of interest may be temporally aligned. Once aligned, they may be summed to increase the signal-to-noise ratio.

In such an arrangement, the time delay for each signal may be calculated by dividing the distance between the original location and the location on the hypothetical acoustic lens by a propagation velocity associated with seismic energy recorded by the seismic receivers. In one arrangement, the propagation velocity is an assumed velocity. In a further arrangement, this propagation or signal velocity may be solved for each seismic receiver through an iterative process of signal sharpening. This may include adjusting the phase of each seismic signal such that the seismic signals add constructively. Accordingly, this may include transforming the seismic signals into frequency-based signals. Further, such iterative processing may include adjusting signal velocity for each seismic receiver.

The present aspect may be utilized to generate two-dimensional and/or three-dimensional subterranean images. In this regard, the utility may further include repeating the selecting, adjusting and summing steps for a plurality of subterranean points of interest. Subterranean points of interest may lie along a common line such that a profile is generated. In one arrangement, this profile is for a common depth. In further arrangements, profiles for a plurality of depths may be combined. In one arrangement, this allows for creating a plurality of two-dimensional profiles. Furthermore, such two-dimensional profiles may be generated to generate a three-dimensional image.

According to another aspect, a utility is provided for generating an acoustic lens for focusing on a subterranean point of interest. The utility includes obtaining a plurality of seismic signals from an array of seismic receivers and selecting a subterranean point of interest. Once a subterranean point of interest is selected, a first distance of a ray between each receiver and the point of interest may be determined. Likewise, a second distance between each receiver and a spherical surface of an assumed acoustic lens may be determined. In such an arrangement, the subterranean point of interest may be at the center of the spherical surface. Each signal of the receivers may then be time-delayed based on the difference between the first and second distances in order to provide a time-delayed signal. Once each of the signals are time-delayed, based on the distance to the spherical surface, the information in each of the signals associated with the point of interest may be substantially aligned. Accordingly, these aligned signals may be utilized to identify a reflection value for the point of interest.

In this regard, it will be appreciated that time delaying each of the signals may provide a rough cross-correlation for each of the signals based on, for example, an assumed velocity. In order to fine tune correlation of the signals, it may be further desirable to compute phase adjustments for the signals of all the receivers. In this regard, the utility may include adjusting each of the seismic signals based on a phase value of each of the seismic signals. This may include transforming the seismic signals into frequency domain signals.

DETAILED DESCRIPTION

Figure 1:
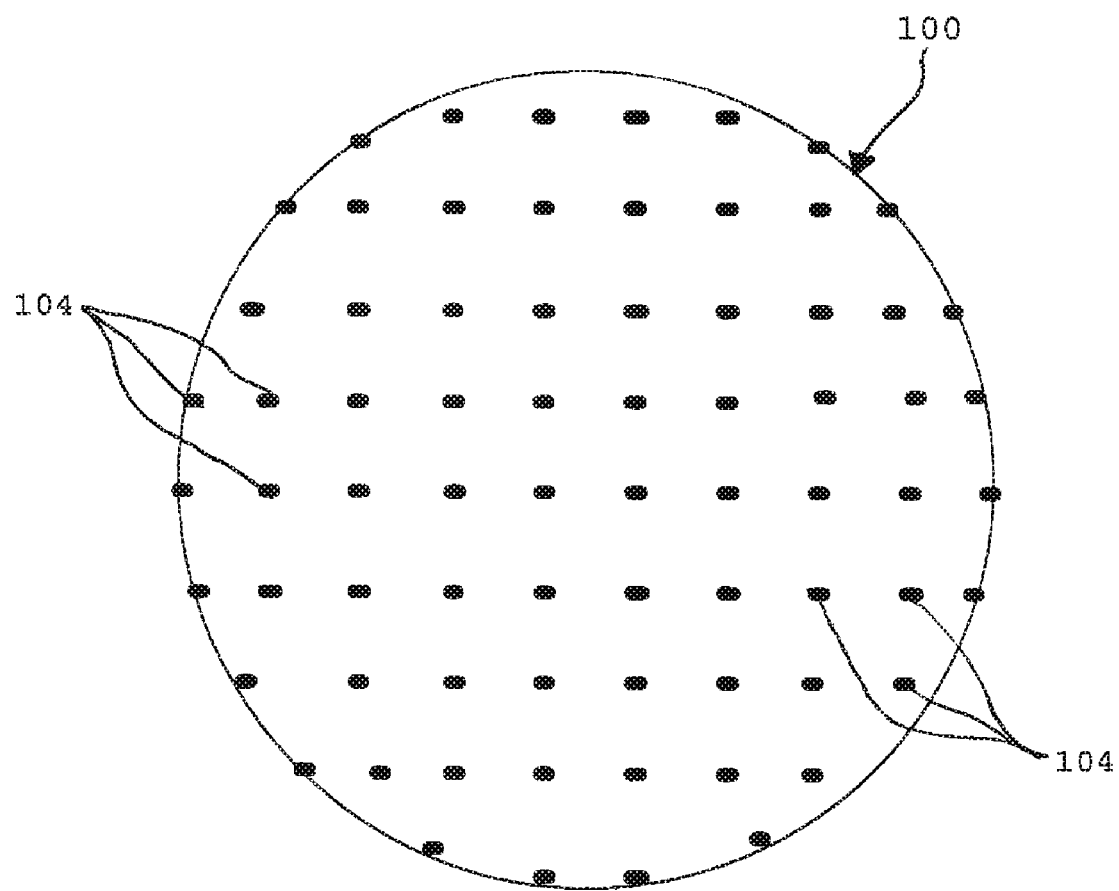
FIG. 1 illustrates an array of seismic data acquisition modules.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims. For instance, while in certain implementations as described below, the present invention utilizes passive seismic signals to generate subterranean images, some aspects of the present invention may be utilized with active seismic acquisition where one or more active seismic sources (e.g., explosives, vibrators, etc.) are utilized.

FIG. 1 depicts a physical layout of a seismic array 100 in accordance with one implementation of the present invention. In the present implementation, a number of data acquisition modules 104 (e.g., geophones) are arrayed in a circular pattern on the ground. As shown, each dot represents a module 104. However, it will be appreciated that a more common rectangular array may be utilized (though the discrimination attainable with such an array may be lower) and is within the scope of the present invention. The number of modules 104 deployed may vary considerably depending on the requirements of the survey. In any array implementation the location of each individual module 104 may be known or determined. Such location information is used in conjunction with seismic data recorded by each module 104 to determine subsurface information. In one arrangement, the modules 104 may include locating circuitry (e.g., GPS circuitry). However, this is not a requirement. In any array arrangement, it may be preferable that the modules be spaced such that each module is substantially equidistance from each of its neighboring modules. Such equidistance spacing may facilitate implementation and processing.

Connected to each of the modules 104 is one or more sensors configured as individual sensors and/or multi-component sensors. Each of the modules 104 may contain electronics to amplify, digitize, and store the signals from the sensors, or in the case of digital sensors, collect and store the data. The data acquisition modules may contain additional circuitry to test the sensors and/or the acquisition circuitry to ensure proper function and performance.

The modules 104 may be connected together by electrical or fiber optic cables. Irrespective of the wiring configuration, the modules are typically in data communication with a central control and recording system 110. It will be further appreciated that the modules 104 may be in wireless communication with one another and/or the central control and recording system 110. In any arrangement, seismic data is generally acquired at the data acquisition modules 104 and collected the central control and recording system 110.

The central control and recording system usually consists of a computer with a display, keyboard, interface to the modules, and digital storage system. In one implementation, the central control and recording system may consist of a standard notebook computer with an Ethernet, USB, wireless or other interface to connect to the modules or wire taps associated with the modules. Data may be stored on the computer's internal hard disk. For larger systems, the central control and recording system might consist of a larger computer with separate display and keyboard and separate storage device such as a tape drive, one or more hard disks, or some other storage device consistent with storing relatively large amounts of data.

In the present invention, modules 104 of the seismic array 100 are utilized for passive reflective imaging. In this regard, the modules 104 of the array 100 record seismic information that is associated with natural seismic sources and/or man-made sources of noise present within the earth or oceans. For instance, micro-quakes, as well as surface weather events, may account for natural sources of passive seismic energy. Man-made sources may include, for example, noise generated by pumping oil wells, traffic, construction, and mining operations and in the ocean, ships within a region. In any case, the passive system does not rely upon the use of active seismic sources such as explosives or vibrators or active sonar in the ocean.

Passive reflective imaging is similar, at least in part, to the theory of acoustic daylight imaging. As discussed above, when scattered light is focused by an optical lens onto a focal surface, such as a retina or film, an image is created. Likewise, it is theorized that acoustic energy within the earth is reflected by objects in the earth and that an acoustic lens may be utilized to focus this acoustic energy. That is, acoustic energy caused by seismic sources (e.g., passive or active) scattered by subterranean objects can be focused to provide an image of those objects. As discussed herein, the passive reflective imaging system and technique provides a means for effectively focusing on subterranean objects in order to generate images of such objects.

Figure 2:
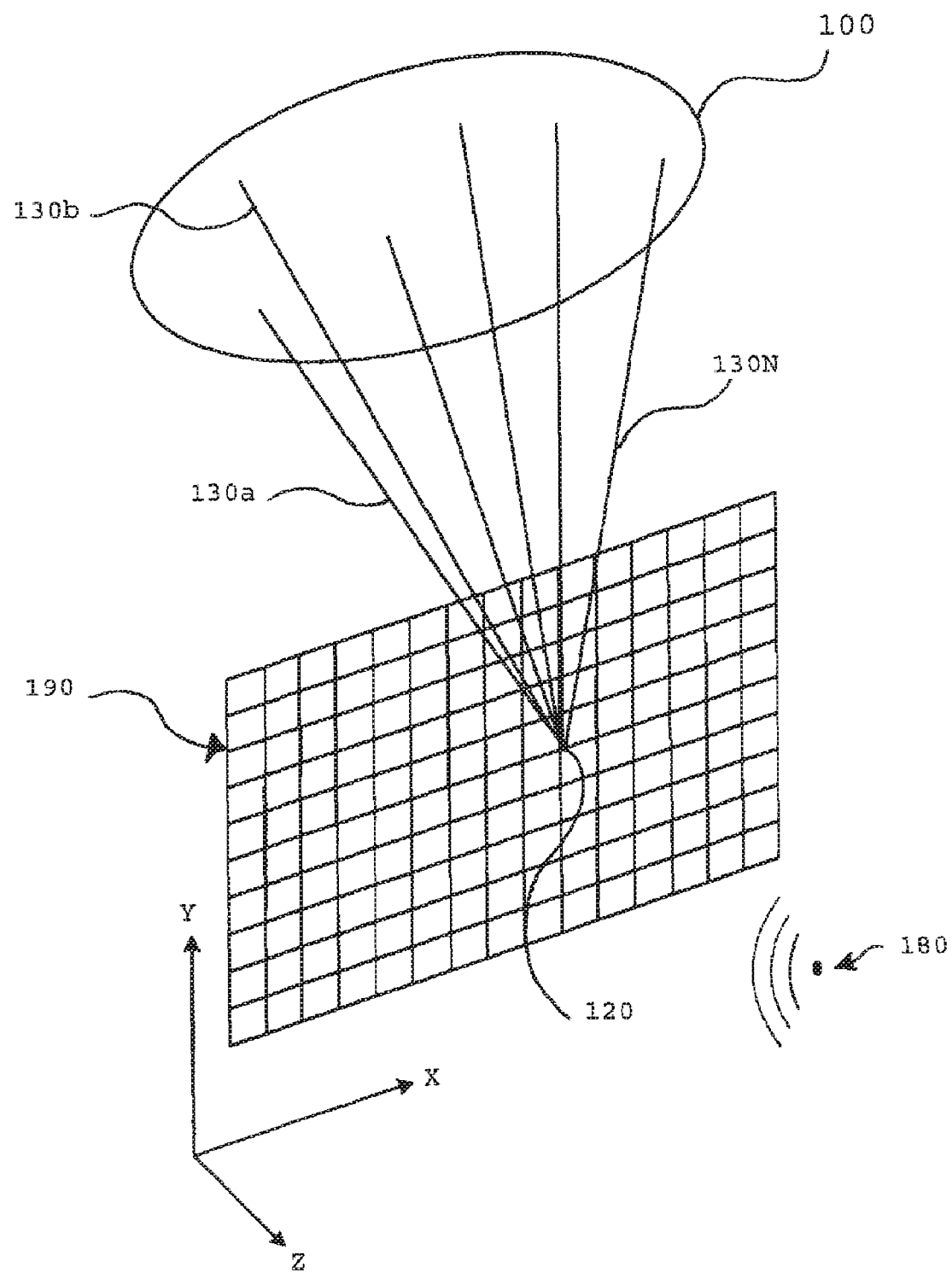
FIG. 2 illustrates receipt of seismic data from a subterranean point of interest.

The present passive reflective imaging technique is also based in part on the theory that every granule within a rock is a potential reflector. That is, if there is an impedance contrast (i.e., a variation in the index and refraction), seismic waves will reflect off these granules of rock. Accordingly, for any subterranean point 120, energy received from a passive seismic source 180, such as a micro-quake 180, will be reflected from the subterranean point 120. See FIG. 2. In this regard, the location of the seismic source 180 is not important. That is, acoustic/seismic energy received by the point of interest 120 from the seismic source 180 is reflected in substantially all directions therefrom. More specifically, some of this energy is reflected towards the surface along various rays 130A-130N to the modules 104 within the array 100. Accordingly, the seismic trace recorded by each module 104 of the array 100 theoretically includes information reflected from any given subterranean point, such as point 120. Therefore, the problem becomes identifying the pertinent portion of each seismic trace in order to add corresponding portions of these traces to ascertain information associated with the point of interest 120.

As will be appreciated, the data acquisition modules 104 of the array 100 may function to record passive seismic/acoustic energy at synchronized starting and stopping times. However, due to the travel paths between the point of interest 120 and each individual module being different, the temporal location of the data associated with the point of interest 120 in each seismic trace may be different. Accordingly, in order to stack the multiple traces together in order to improve the signal-to-noise ratio and thereby generate impedance information associated with the point of interest, the data associated with the point of interest in each of the traces of each of the individual modules must be temporally aligned.

Figure 3:
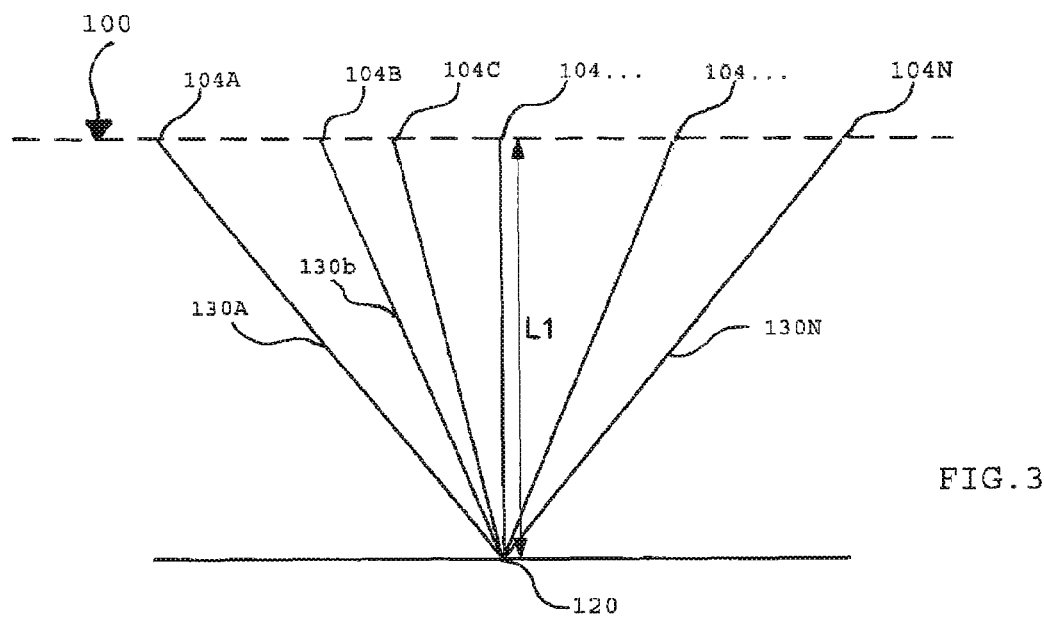
FIG. 3 illustrates different ray path lengths between individual data acquisition modules and the subterranean point of interest.

The difference in the length of the different rays 130 between the point of interest 120 and various modules within the array 100 is illustrated in FIG. 3. As illustrated, FIG. 3 is a side plan view of the array 100 and multiple rays 130A-130N. However, it will be appreciated that such illustration is by way of convenience and not limitation. In actuality, the multiple rays 130A-130N shown in FIG. 3 may originate from a common focal point 120 and extend to multiple non-aligned modules on the surface within the array 100. That is, the modules 104 located on the surface need not be aligned and may be disposed at different x, y locations within the array 100. As noted above, due to the different lengths of each ray 130A-130N, the acoustic/seismic energy reflected from the point of interest 120, for a common seismic event, arrives at different modules at different times.

Figure 4:
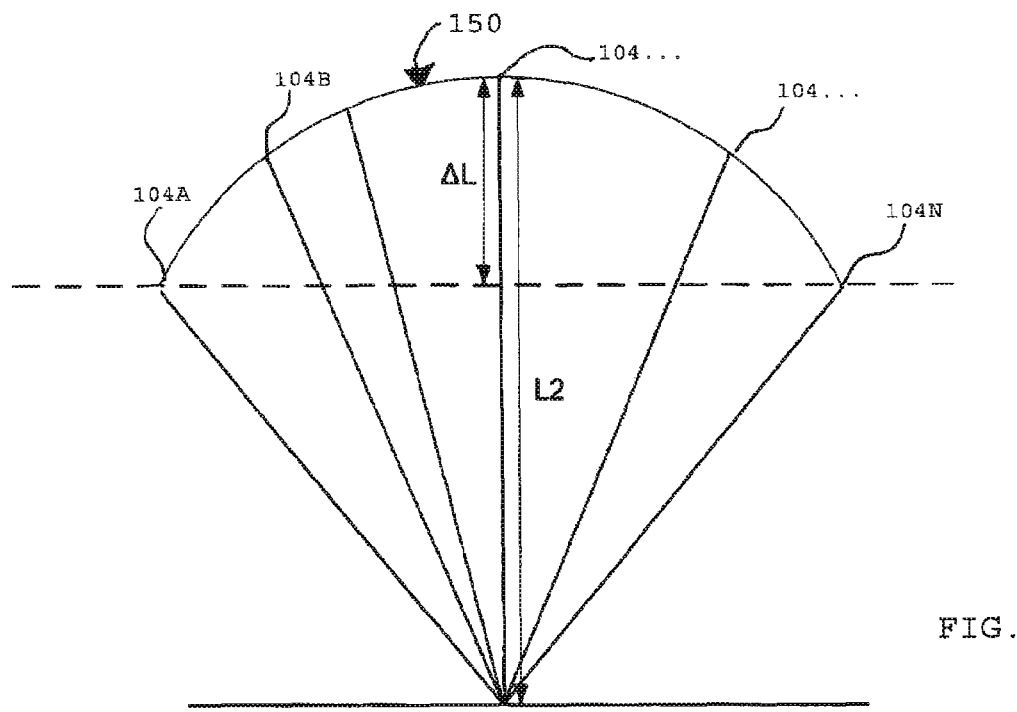
FIG. 4 illustrates adjusting the length of the ray paths to form an acoustic lens.

In order to align the arrival times of the acoustic/seismic energy from the point of interest in different traces, the passive reflective imaging technique delays individual traces of the modules within the array 100. These delays are generated by determining the length $L_1$ of each individual ray 130A-130N and adjusting the length of each ray 130A-130N to place each module at a common theoretical distance $L_2$ from the point of interest 120. See FIGS. 3 and 4. The difference between adjusted length $L_2$ and the original length $L_1$ (i.e., $\Delta L$) for each ray is divided by an estimated average velocity for the acoustic/seismic energy. Accordingly, the result of this calculation is the time delay that is applied to each individual trace. Once adjusted by their individual delays, these traces may be stacked to provide information for the point of interest. Prior to such stacking, additional processing can be performed to make velocity adjustments for each ray through an iterative process of signal sharpening, as will be discussed herein.

Importantly, by shifting the trace of each module to a common theoretical distance from the point of interest, the modules are effectively placed on a spherical surface 150, defining a constant hemispherical receiver. Stated otherwise, this spherical surface 150 defines an acoustic lens having a focal point located at the point of interest 120. Of note, the spherical surface 150 may include all modules 104 of the array or, a subset of the modules 104. Referring again to FIG. 2, it will be noted that subsurface area 190 may be divided, for example, into an x-y grid. Accordingly, each intersection of the grid may define a point of interest. By solving each point of interest along, for example, a common axis, a profile may be generated for that axis. Stated differently, an array focus location (i.e., point of interest) may be steered across the region of interest for a particular depth slice. In this regard, multiple acoustic lens may be generated to allow for solving for multiple different points of interest.

If a point of interest has a high reflectivity, this may indicate the presence of a subterranean event and that point of interest may be represented as a bright region. In contrast, a point of interest along a common line that is in a more homogenous formation (i.e., not located near a subterranean event) may be represented as a dim region with a low impedance contrast. In this regard, for a particular depth slice, parts of the structure may be bright and others maybe dim. However, by calculating for each point at the common depth and along a common axis (e.g., x axis or y axis) a 2-D profile may be developed. Further, by combining multiple 2-D profiles (e.g., having different y offsets), reflection information for a common depth slice may be generated. Accordingly, two-dimensional slices for each depth slice may be combined to generate three-dimensional information for each depth slice. That is, three-dimensional images may constitute two-dimensional horizontal images taken at vertical slices. Likewise, the procedure may be repeated for deeper and/or shallower depth slices such that information of different depth slices may be combined to provide a subterranean image or topology. Note also that 2-D images of the same region with different array locations can also provide 3-D information.

Generally, passive reflective imaging utilizes all detectable vibrations within the earth's surface or within the ocean. This provides several benefits for seismic imaging. For instance, the ability to utilize such vibrations within the earth's surface results in short data collection times. Further, this allows sensors to be located on the surface as opposed to being buried in the subsurface. Further, for such passive imaging, a special resolution may be determined by the array diameter and the maximum signal frequency (e.g., propagation frequency of vibrations within the earth's surface), as opposed to sensor spacing. Accordingly, the passive reflection imaging technique may require the use of significantly fewer receivers/modules than utilized in active seismic imaging. This may reduce the capital costs as well as labor required to perform seismic surveying. Accordingly, significant savings may be realized by utilizing passive reflective imaging for seismic surveying as opposed to active seismic acquisition techniques.

Figure 5:
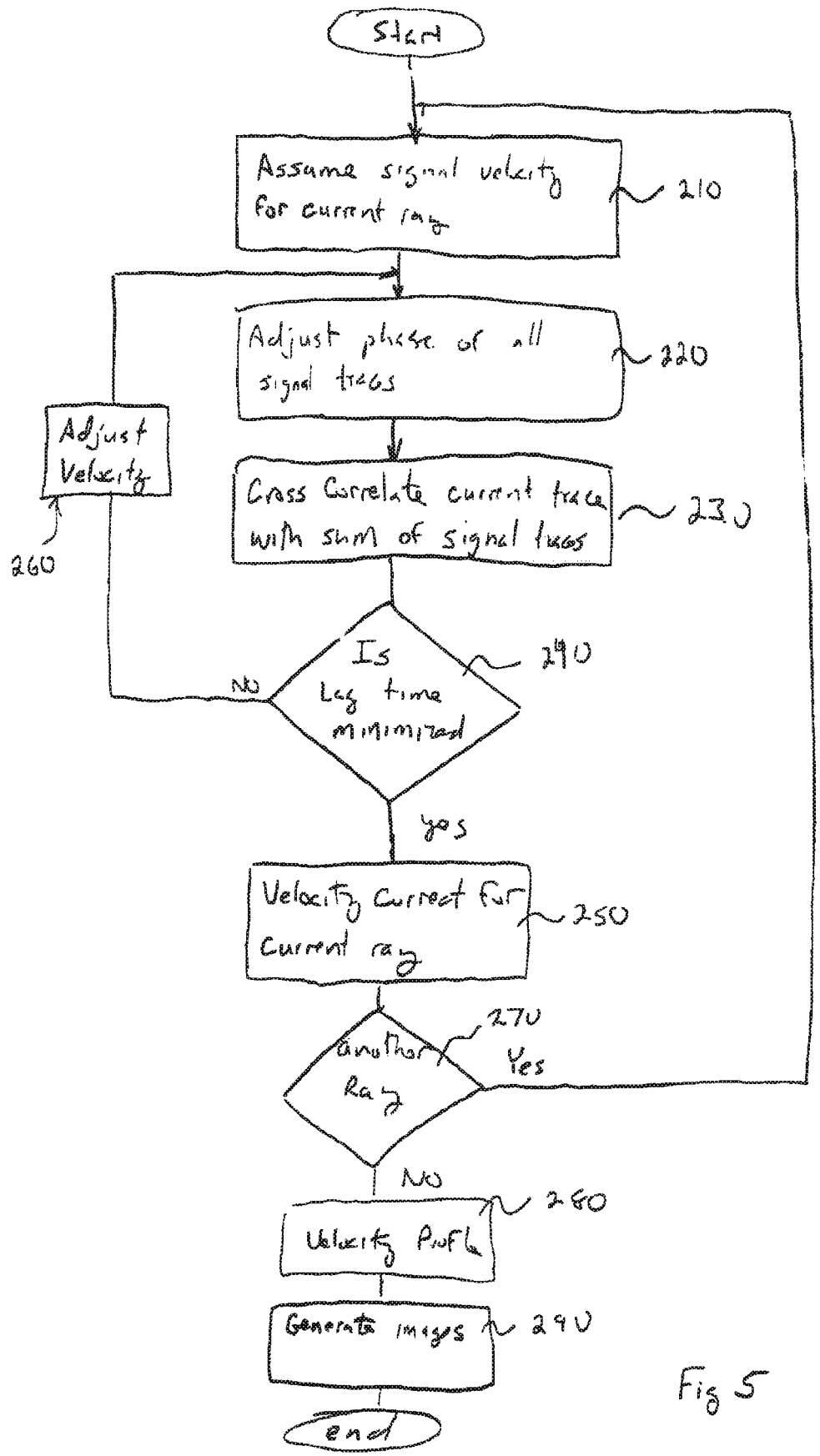
FIG. 5 illustrates a process for generating a subterranean image.

As noted above, an average velocity is utilized to determine the time delays to be applied to each module of the array 100 in order to place those modules on the spherical surface/acoustic lens 150. While effective for providing a rough correlation between the traces of the individual modules, it will be appreciated that such adjustments are based on an assumed signal velocity. However, as the velocity of seismic energy travels through the earth at different rates based on the density and/or the composition thereof, such an assumed velocity may not be sufficient to provide highly accurate information associated with the focal point/point of interest. Accordingly, to improve the image quality, a signal sharpening process is performed. That is, rather than delaying the signals based on estimated velocity, a velocity is solved for each ray 130A-130N (i.e., shortest path in time from an individual travel path from focal point to an individual sensor). A process 200 for calculating individual signal velocities is illustrated in FIG. 5. Initially, the signal velocity is assumed 210 for a ray of an individual module. In this regard, the distance between the module and the focal point may be determined, and the trace of the module may be temporally offset (e.g., delayed) such that the trace is temporally aligned as if the module had been located on the surface of the acoustic lens. A phase adjustment may then be made for all of the sensors. Such phase adjustment may include performing a fourier analysis on each of the signals. As will be appreciated, adjusting the phase permits stacking and cross correlation for a finer adjustment to get a higher signal-to-noise ratio and velocity variations. In any case, the phase of the signals is adjusted such that the signals add constructively.

Cross-correlation 230 of each signal trace with a sum of all the traces may then be performed to identify any lag between the current trace and the sum of the time-delayed traces. The resulting lag time information may be used to readjust the phase if necessary.

A determination 240 is made as to whether the lag time between the trace of the current ray and the sum of the rays is zero (0) or otherwise adjusted/reduced. If so, then the velocity for the current ray is determined correct 250. If not, the assumed velocity is adjusted 260, and the steps 220-240 are repeated. The process may be repeated 270 until velocities for all rays in the array (or a subset of the rays) are determined. For instance, for each focus location across a depth slice, an average velocity may be computed. This average velocity may be refined by sharpening lag times to improve the image. Likewise, the same process may be performed in the y axis. As will be appreciated, this results in the calculation of numerous iterative processes for numerous individual modules and traces. The result is that a velocity profile 280 is generated that may be utilized to generate 2-D and/or 3-D subterranean images. That is, once the seismic data is processed to identify velocity profiles for the receivers, the resultant processed data may be displayed in the form of a 2-D horizontal slice maps which display various geologic features situated on the 2-D slice maps in the earth formation. These various 2-D slice maps may be combined to generate 3-D maps of subsurface objects/geology. Of note, for passive reflective imaging, only relative velocities are required to generate a crisp reflection image. Refinement of the velocity profiles will result in removing distortions in the shape of reflectors and accurate locations of underground structures.

As will be appreciated, the seismic data is acquired by the modules of the array. The modules receive seismic energy that is transmitted through the earth over a period of time. As a result, large volumes of data are recorded which need to be stored and processed before final interpretation can be made. As will be appreciated, processing of the data to form multiple acoustic lenses to solve for multiple focal points requires significant computer resources to store and execute software for focusing on individual points of interest. Accordingly, such processing may be performed subsequent to data gathering.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in connection with seismic exploration, comprising:
    using an array of seismic receivers, obtaining a plurality of seismic signals associated with seismic information;
    selecting a subterranean point of interest;
    using a processing system, adjusting each of said signals to focus on data associated with said point of interest to produces a plurality of adjusted seismic signals, wherein said adjusting each of said signals comprises time delaying at least a portion of said signals such that ray paths between corresponding ones of said seismic receivers and said point of interest are substantially equal, and wherein said time delaying comprises calculating distances between said receivers along their respective ray paths and a position on a hypothetical spherical surface, wherein said point of interest is a center of said spherical surface and wherein said time delay for each said signal is based on said distances; and
    using said processing system, summing said adjusted seismic signals, wherein a sum of said adjusted seismic signals is indicative of a reflection value for said subterranean point of interest.

2. The method of claim 1, wherein said time delay is calculated by dividing said distance with a propagation velocity associated with seismic energy recorded by said seismic receiver.

3. The method of claim 1, further comprising:
    repeating the selecting, adjusting, and summing steps for a plurality of subterranean points of interest.

4. The method of claim 3, wherein said plurality of subterranean points of interest have a common depth.

5. The method of claim 3, wherein said plurality of subterranean points of interest lie along a common line and refraction values of said plurality of subterranean points of interest along said common line define a two-dimensional profile.

6. The method of claim 5, wherein said plurality of subterranean points of interest lie along a plurality of common lines and reflection values of said plurality of subterranean points of interest along said common lines define two-dimensional profiles.

7. The method of claim 6, further comprising:
using two or more of said two-dimensional profiles to generate a three-dimensional profile of a subterranean area of interest.

8. The method of claim 1, wherein obtaining said seismic signals comprises:
recording data associated with passive vibration sources.

9. The method of claim 1, wherein at least a portion of said seismic receivers are surface based receivers.

10. The method of claim 1, wherein adjusting each said signal further comprises:
adjusting the phase of each seismic signal such that said seismic signals add constructively.

11. The method of claim 10, further comprising:
transforming said seismic signals into frequency domain signals.

12. The method of claim 10, further comprising:
adjusting signal velocity for said seismic signals.

13. A method for use in connection with seismic exploration, comprising:
using an array of seismic receivers, obtaining a plurality of seismic signals associated with passive seismic vibrations;
selecting a subterranean point of interest; and
using a processing system:
time delaying each said signal such that ray paths between said seismic receivers generating said signals and said point of interest are substantially equal, wherein said time delaying comprises calculating distances between said receivers along their respective ray paths and a position on a hypothetical spherical surface, wherein said point of interest is a center of said spherical surface, and wherein said time delay for each said signal is based on said distances; and
identifying a reflection value for said point of interest utilizing said seismic signals from said seismic receivers.

14. The method of claim 13 wherein said time delay is calculated by dividing said distance with a propagation velocity associated with seismic energy recorded by said seismic receiver.

15. The method of claim 13, wherein identifying comprises iteratively solving said reflection value using said seismic signals.

16. The method of claim 13, wherein identifying further comprises:
adjusting each of said seismic signals based on a phase value of each of said seismic signals.

17. The method of claim 16, further comprises:
transforming said seismic signals into frequency domain signals.

18. The method of claim 16, further comprising:
summing said seismic signals.

19. The method of claim 13, further comprising:
repeating the selecting and identifying steps for a plurality of subterranean points of interest.

20. The method of claim 19, wherein said plurality of subterranean points of interest have a common depth.

21. The method of claim 19, wherein said plurality of subterranean points of interest lie along a common line and reflection values of said plurality of subterranean points of interest along said common line define a two-dimensional profile.

22. The method of claim 20, wherein said plurality of subterranean points of interest lie along a plurality of common lines and reflection values of said plurality of subterranean points of interest along said common lines define two-dimensional profiles.

23. The method of claim 22, further comprising:
using two or more of said two-dimensional profiles to generate a three-dimensional profile of a subterranean area of interest.

24. A method for use in connection with seismic exploration, comprising:
obtaining a plurality of seismic signals using an array of seismic receivers;
selecting a subterranean point of interest;
using a processing system that is operative to receive information originating from each said receiver:
determining a first distance of a ray between said receiver and said point of interest;
determining a second distance along said ray between said receiver and a spherical surface, wherein said point of interest is at a center of said spherical surface;
time delaying the seismic signal of said receiver based on said first and second distances to produce a time delayed signals; and
identifying a reflection value for said point of interest using a plurality of said time delayed signals.

25. The method of claim 24, further comprising:
adjusting the phase of said time adjusted signals.

26. The method of claim 24, further comprising:
cross-correlating said time delayed signals.

27. The method of claim 24, wherein time delaying each said signal comprises:
dividing the difference between said first and second distances with an assumed propagation velocity associated with seismic energy recorded by said seismic receiver.

28. The method of claim 27, further comprising:
iteratively adjusting said propagation velocity to reduce a lag time associated with said signal.

29. A system for use in connection with seismic exploration, comprising:
a plurality of seismic receivers for recording seismic information and generating seismic signals, wherein said receivers are disposed in an array; and
a processor operative to obtain said seismic signals originating from said seismic receivers, said processor further operative to:
determine a first distance of a ray between a physical location of each said receiver and a subterranean point of interest;
determine a second distance along said ray between each said receiver and a spherical surface, wherein said point of interest is at a center of said spherical surface;
time delay the seismic signal of each said receiver based on said first and second distances to produce time delayed signals; and
identifying a reflection value for said point of interest using a plurality of said time delayed signals.

* * * * *